United States Patent [19]

Gheith

[11] Patent Number: 5,797,014

[45] Date of Patent: Aug. 18, 1998

[54] METHOD FOR REDUCING PROCESSOR CYCLES USED FOR GLOBAL OFFSET TABLE ADDRESS COMPUTATION IN A POSITION INDEPENDENT SHARED LIBRARY

[75] Inventor: Ahmed Mohammed Gheith, Round Rock, Tex.

[73] Assignee: International Business Machines Corporation, Armonk, N.Y.

[21] Appl. No.: 572,467

[22] Filed: Dec. 14, 1995

[51] Int. Cl.$^6$ ..................................................... G06F 9/45
[52] U.S. Cl. ........................... 395/710; 395/705; 395/685; 364/280.4
[58] Field of Search ........................... 395/705, 706, 395/708, 710, 685, 590; 364/280.4

[56] References Cited

U.S. PATENT DOCUMENTS

| | | | |
|---|---|---|---|
| 5,369,766 | 11/1994 | Nakano et al. | 395/700 |
| 5,446,899 | 8/1995 | Brett | 395/700 |
| 5,475,840 | 12/1995 | Nelson et al. | 395/700 |

OTHER PUBLICATIONS

Crowe, M., "Dynamic Compilation in the Unix Environment", Software Practice and Experience, vol. 17(7), 455–467, Jul. 1987.

McAuliffe, M et al., "A Trace–Based Simulation of Pointer Swizzling Techniques", IEEE Data Engineering, 1995 11th International Conference, pp. 52–61, Mar. 1995.

Dewhurst, S., "Flexible Symbol Table Structures for Compiling C++", Software Practice and Experience, vol. 17(8), 503–512, Aug. 1995.

*Primary Examiner*—Emanuel Todd Voeltz
*Assistant Examiner*—Michael T. Richey
*Attorney, Agent, or Firm*—Mark S. Walker

[57] ABSTRACT

A process for compiling shared library source code into libraries in which the global offset table location is calculated only when a cross module boundary function call is made. The compiler process allocates a single global offset table pointer and then pre-appends a word to each function entry point containing the offset from that function entry point to the global offset table pointer. A calling module accesses the global offset table pointer and loads a global offset table register based on the offset and function entry point. Pointer logic instructions are inserted before pointer based branches using instruction cycles that would otherwise be lost to a pipeline stall in the preferred architecture.

6 Claims, 3 Drawing Sheets

METHOD FOR REDUCING PROCESSOR CYCLES USED FOR GLOBAL OFFSET TABLE ADDRESS COMPUTATION IN A POSITION INDEPENDENT SHARED LIBRARY

CROSS-REFERENCE TO RELATED APPLICATION

The present invention is related to the applications entitled "Method for Generating Shared Library Executable Code with Lazy Global Offset Table Address Calculation", bearing Ser. No. 08/572,471, filed Dec. 14, 1995 and "Method for Efficient External Reference Resolution in Dynamically Linked Shared Code Libraries in Single Address Space Operating Systems" filed on Dec. 14, 1995 and bearing Ser. No. 08/572,470 and bearing attorney docket numbers AT995-029 and AT995-031, respectively.

BACKGROUND OF THE INVENTION

1. Field of the Invention

The present invention relates to processes for compiling source code into object code. In particular, the present invention relates to a method for generating shared library code that postpones global offset table address calculation until it is required. Still more particularly, the present invention relates to a process for analyzing shared library code during compilation and generating intermediate code for determining global offset table address values immediately prior to their use.

2. Background and Related Art

Computer systems such as the IBM Risc System/6000 are able to execute a large number of programs concurrently. Computer system efficiency is improved by using libraries of shared program code that are shared by all executing programs. Shared libraries eliminate the need to include the library code in each executable program thereby reducing the size of the executable programs. A reduction in executable size reduces the disk storage that must be dedicated to program storage. Shared libraries also improve memory efficiency by allowing a single copy of the library to be present in system memory rather than requiring a copy to be present for each application program that uses it.

Dynamically linked libraries are linked at run time by the application program. Each library makes certain functions and variable values available for use by application programs. These functions and values are called exported functions and exported variables of the library. At application compile time, therefore, the external references to the precise memory location of the exported library variables are not known. The system must provide a mechanism for the application to resolve external references at run-time. Resolution of a reference is the process of determining a memory address for a referenced variable. The memory address allows the program to access that variable data stored at that address.

Shared libraries provide memory position independent pure code, i.e. the code of the library is not modified to account for actual loaded memory location when the library is loaded for execution. The external reference address resolution mechanism must be able to provide an address without requiring load-time modification of the base library code.

Prior art systems have solved this problem in several ways. The AIX operating system creates an exported variable table of contents (TOC) for each shared library. The TOC maps the external references of a library to memory locations. The AIX TOC for a library is adjusted at runtime to reflect the actual memory location of the library functions and variables. The AIX compiler builds the TOC when the library source code is compiled.

All references to an exported variable in AIX require indirect access through the TOC. Indirect access is required even when the exported variable is in the same module as the referencing instruction. This is because the referencing instruction does not know whether the referenced variable is internal or external and therefore must proceed as though it was external to make sure it is correctly accessed. Indirect references are slower than direct references and can impact application performance. In addition, the TOC must always be available to the calling program. A register (typically R2) is dedicated to point to the address of the TOC by convention. The programs must always ensure that the designated register points to the correct TOC, i.e. the TOC for the library function to be accessed. The register must be modified each time a different library is accessed. All function calls in such a system are indirect. The function call first accesses a function description table (FDT) that sets the designated register (e.g. R2) to point to the correct TOC and then accesses the requested function.

The disadvantage of the TOC approach is that most of the code in a program does not require external reference resolution. The TOC architecture, however, requires all references to be through the TOC whether or not they are external to the function. Thus, internal references to the exported variables are slowed by the requirement of indirect reference through the TOC.

The Sun Microsystems Solaris operating system solved the external reference problem in a different way. The Solaris operating system uses a Global Offset Table (GOT) to resolve references. The GOT is created by the compiler at a predetermined location within each library. The location is established so that the program can calculate the location of the GOT at any time thus eliminating the need to provide a register pointing to the GOT table. The GOT is placed by the compiler at the end of the library code. The program can then determine the relative location by determining where the end of the code is relative to the current position.

The relationship between a load module and its GOT is fixed at load time. Each time a program accesses a new load module, it must recalculate the address of the GOT for that module. Systems such as the IBM PowerPC microprocessor do not have a mechanism to detect module boundary crossings by a function call. Thus, each function call must recalculate the GOT address since it does not know whether the call crosses a load module boundary or not.

A shared library has the advantage that only one copy of the library code needs to be present in the computer system memory even though several programs are using that code. Multiple client programs can access the library through function calls. Each client instance maintains a separate set of variable data but executes the same set of code. Multiple use of a single set of library code increases memory efficiency. It is important, however, that the sharing of code not introduce additional overhead that eliminates the performance advantage of shared library code.

A technical problem therefore exists of delaying global offset table address computation until the address is needed and avoiding the computation if the address is not needed. The problem is to find a process that enables the executable code to determine when computation is required in a processor that does not signal module boundary crossing.

SUMMARY OF THE INVENTION

The present invention is directed to a process for compiling shared library code to minimize global offset table address computation. The present invention establishes a link module convention requiring that each link module have a single location containing a pointer to the global offset table (GOT) for that module. Each exported function will have inserted immediately before its entry point a word containing the offset of the GOT pointer for that link module from the exported function. The placement of the offset to the GOT for a module in a known relation to the function entry point enables calling modules to readily find the called module GOT address. The GOT address is recomputed only when a function call crosses a module boundary thus avoiding costly recomputation processing for intra-module function calls.

The present invention relates to a method for eliminating intramodule function call global offset table address calculation during compilation of a plurality of callable functions compiled to create an executable module, the method comprising the steps of: inserting before each function entry point an offset value representing the offset from the entry point address to a module global offset table for the module; testing each function call to determine whether the called function is local to the module or external to the module; replacing each external function call with a first calculation of the called module global offset table based on the function entry offset and the function entry address and then a branch to the function entry address; and replacing each local function call with a direct call to the function.

It is therefore an object of the present invention to provide a method for transforming shared library source code into an executable link module that calculates the module global offset table address only on cross module boundary function calls.

It is yet another object of the present invention to provide a method for transforming shared library source code into an executable link module without increasing pointer call logic overhead.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
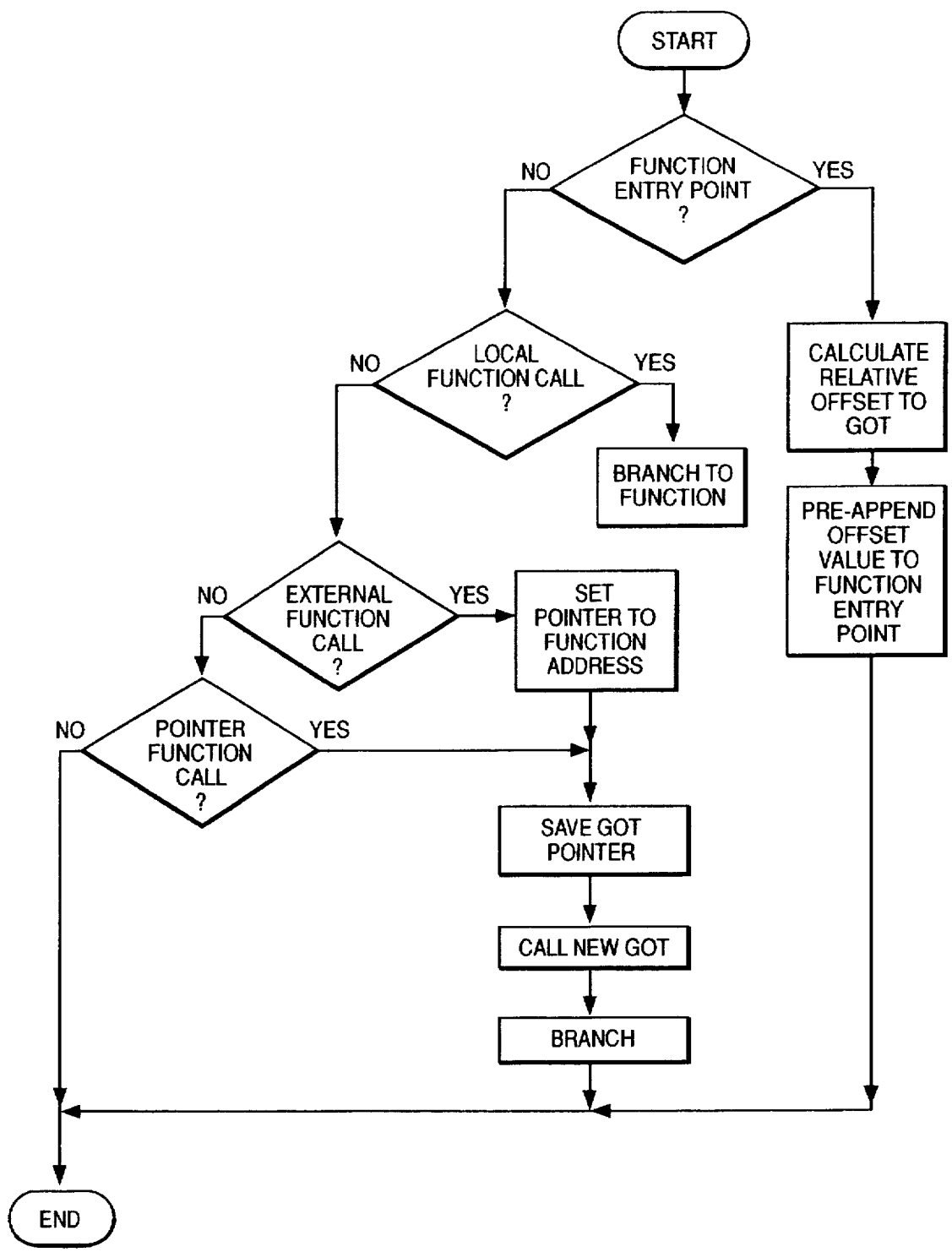
FIG. 1 is a flowchart depicting the process of the preferred embodiment of the present invention.
Figure 2:
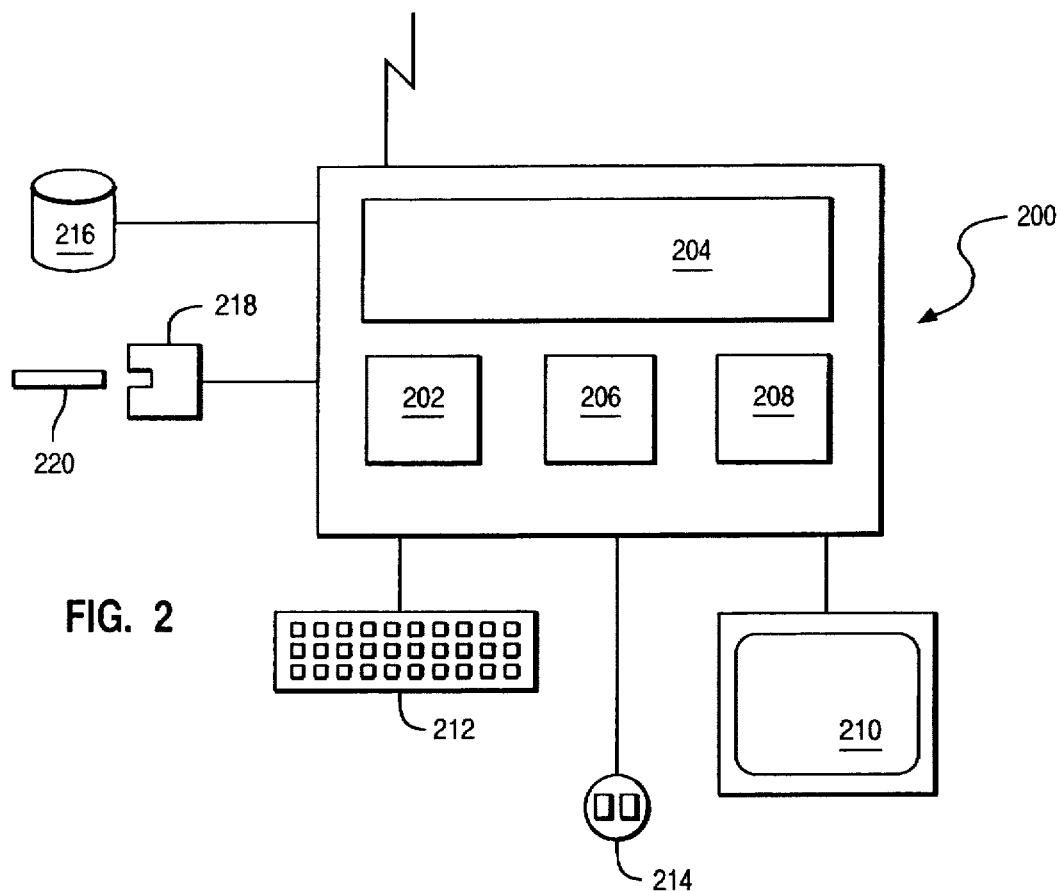
FIG. 2 is a block diagram of a computer system in which the preferred embodiment of the present invention is practiced.

The preferred embodiment of the present invention is practiced in a computer system such as that shown in FIG. 2. The computer system can be any of a number of commercially available systems such as the IBM RISC System/6000 workstation or the IBM Personal Computer workstation. The preferred embodiment requires a system 200 with a processor 202, random access memory 204, input/output controller 206 and network controller 208 for managing the communications with network resources. Processor 202 can be any of a variety of single or multiple processor packages such as the IBM PowerPC microprocessor. Input/Output controller 206 manages input/output resources including, but not limited to, a display monitor 210, a keyboard 212, a pointing device 214, permanent storage 216, and removable storage media 218, 220. Permanent and removable storage media can be any known type including magnetic disk, optical disk or magnetic/optical disks.

Figure 3:
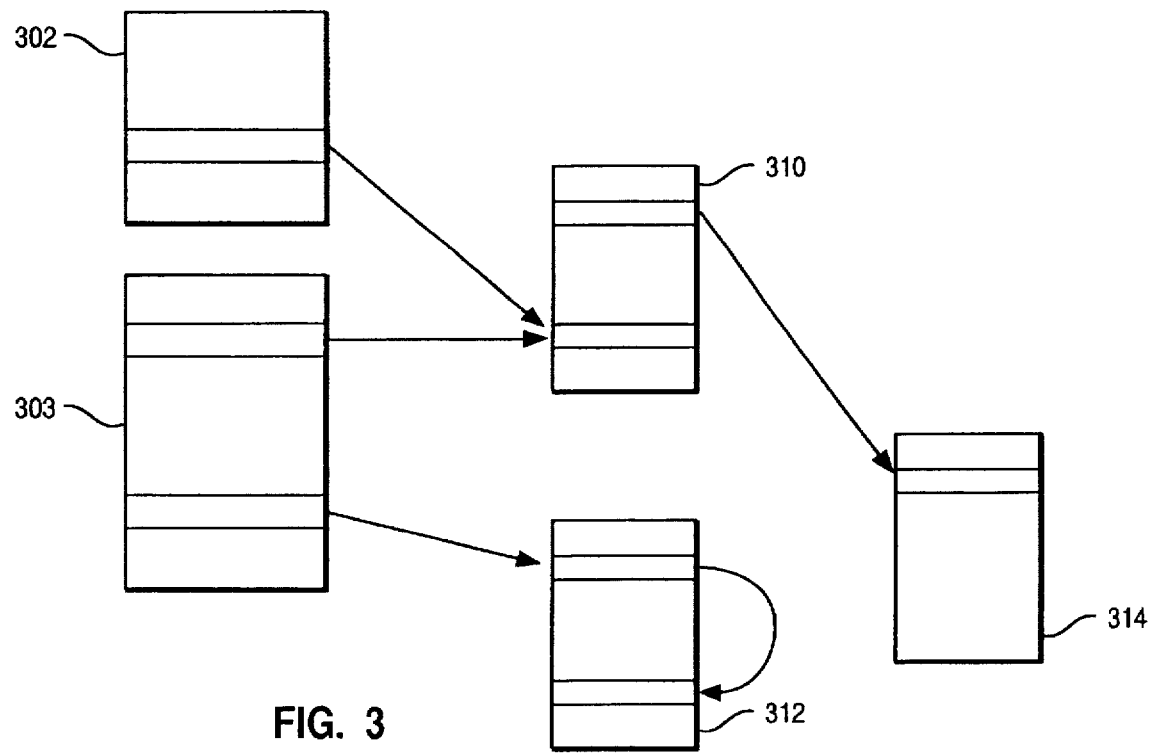
FIG. 3 is a block diagram illustrating the address references in a system according to the present invention.

Shared libraries are used by client processes as shown in FIG. 3. Client programs 302, 303 use functions in shared libraries 310, 312, 314. Although two client processes and three shared libraries are shown, it will be recognized that any number of client programs or shared libraries may be involved without departing from the spirit of the invention. A shared library is typically loaded into the system when it is first invoked by a client process. The present invention is part of the process of setting up the client process to access the shared library whether the shared library is being loaded for the first or later time.

Figure 4:
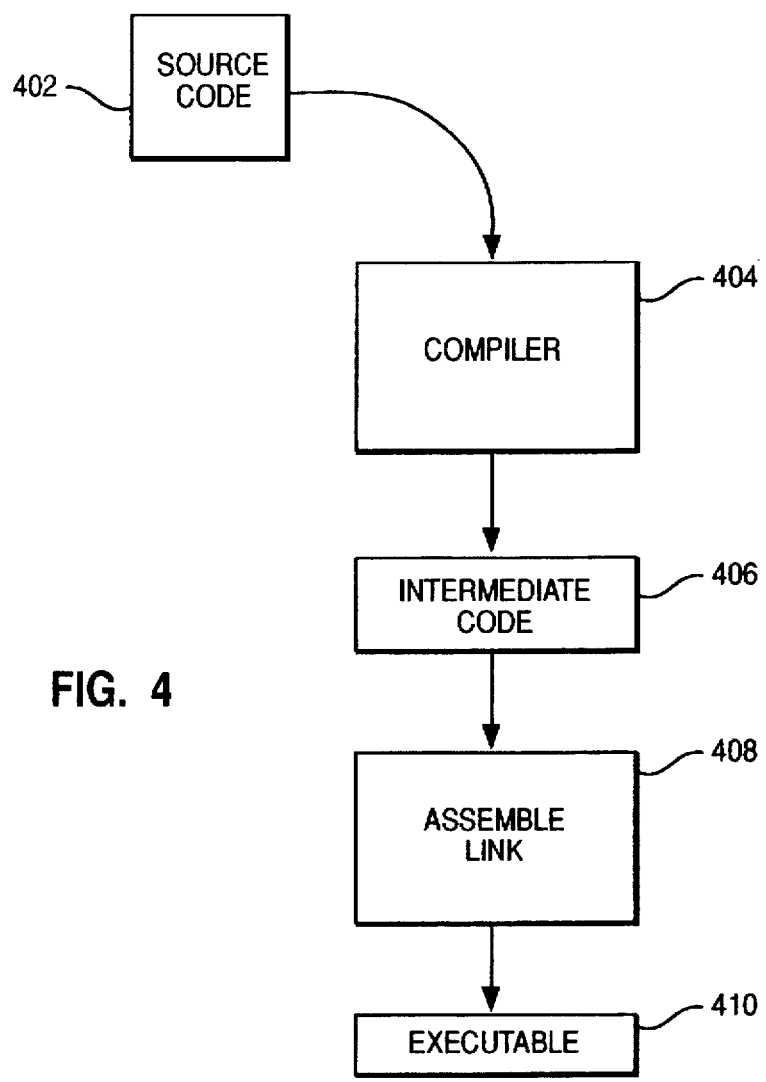
FIG. 4 is a block diagram illustrating the steps of compilation according to the present invention.

The process of the present invention is implemented within a compiler program for compiling program source code into executable code. A compiler typically operates as shown in FIG. 4. Source code 402 is read by compiler 404 and transformed into a set of basic operations known to the computer system. These basic operations are typically expressed as assembly language code 406. The assembly language code 406 is assembled and linked with required object modules to form the final executable 410. The loader loads a program for execution in the computer. The loader loads the program at a specific address in memory and modifies address references within the program based on the loaded location in memory. The GOT table is modified by the loader to correctly resolve shared library external references and is used by the library functions and client processes to resolve references within the library.

The preferred embodiment of the present invention is implemented in a compiler for transforming source code into object code. The compiler analyzes the source code statements and generates intermediate code.

The present invention establishes a link module convention of placing a pointer to the global offset table (the GOT pointer) for the module at a single location within that module. Each exported function in the module will be pre-appended with a word containing the offset of the GOT pointer from the function entry point. In the preferred embodiment, the word immediately preceding the function entry point contains the offset to the GOT pointer. This offset value is determined at link time and does not consume any run time resources when used.

The intermediate assembly code of a module transformed according to the present would appear as follows where the label gotptr: references the single GOT pointer location.

```
.long gotptr - foo # link time constant
foo:
...
...
...
.long gotptr - bar # link time contant
bar:
...
...
gotptr:
.long GOT # contents fixed by loader
```

This approach maintains the function code as pure code except for the last instruction at label gotptr. The value stored preceding each of the function labels in the module (e.g. gotptr-foo) is a link time constant that is evaluated when the module is linked and remains constant regardless of the loaded location of the module. The GOT address in the last line is fixed by the loader to contain the actual address of the GOT.

Functions in the preferred embodiment do not have to compute their GOT address. A general purpose register (RGOT) is reserved as a GOT pointer and is manipulated as part of the linkage convention. As illustrated below, RGOT is loaded by the pointer call logic by determining the offset by accessing the word before the function entry point (−4(R11)) and then using that offset and the function entry point to load the RGOT value (i.e. function entry point R11+offset.)

Three types of function calls must be considered: local calls within a module; calls based on a pointer that may or may not cross a module boundary; and external function calls.

Local function calls are within a module and should not need to recompute the RGOT if it was already valid. A local call to function "foo" is implemented as follows:

```
    ...
    bl foo
    cror 31,31,31 #no-op
    ...
```

Pointer calls may or may not cross a module boundary. The instructions must provide for the case in which a module boundary is crossed, thus the current RGOT value stored before branching to the address in the pointer. The code to accomplish this is as follows:

```
l    r11, pointer         #get the function pointer in R11
bl   ptrgl                # ptrgl will save RGOT and call
                          the function
l    RGOT, GOT_OFF (SP)   # restore RGOT form stack
```

The pointer call logic is implemented as follows:

```
ptrgl:
    mtctr  r11                   # you can squeeze 3 IU
                                 instructions between this
                                 and the bctr
    st     RGOT, GOT_OFF (SP)    # Save current RGOT
    l      RGOT, -4(R11)         # get the GOT offset
    lx     RGOT, RGOT, R11       # load new GOT pointer
    bctr                         #branch to the pointer
                                 address
```

The st RGOT, l and lx instructions are placed to fit in what would have been pipeline stall cycles between mtctr and bctr. This makes storing the current RGOT and loading the new GOT pointer "free" operations. The preferred embodiment uses an IBM PowerPC microprocessor that implements pointer function calls by loading a counter (mtctr) and then branching to that counter (bctr). Other microprocessors may implement pointer function calls differently and may not have "free" instructions. The present invention is applied to such a by inserting the instructions before the instruction that causes branching to the called function.

External function calls are implemented by using a local glue function. This glue function transforms the external function call into a pointer call and then uses the pointer logic described above. The code for this would be as follows:

```
    ...
B1  foo.glue
    ...
foo.glue:
l       r11,FOO_OFFSET(RGOT)  #load the pointer
                              based on the function
                              offset in RGOT
b       ptrgl                 # branch to pointer
                              call logic
```

The process of the present invention, as described above, operates in a compiler for transforming source code to object code. The source program is not changed. The loader must only modify the addresses in the find_got module to account for the actual loaded location of the GOT. The remaining code is position independent pure code.

The present invention has the advantage of avoiding the need for function descriptors containing both the entry point and TOC pointer for the function as used by the AIX operating system. The function pointers of the present invention are globally valid and thus can be readily shared. Although the find_got routine is more expensive in terms of instruction path length than prior art methods of GOT computation, it is used much less frequently resulting in an overall efficiency improvement. The use of idle cycles to store the current RGOT and set the new RGOT further improve the efficiency of this process.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

I claim:

1. A method for reducing function call global offset table address calculation during compilation of a plurality of callable functions compiled to create a shared library module containing executable code, the module having memory position independent code and a global offset table for resolving internal and external function references, the method comprising the steps of:

inserting before each function entry point a function entry offset value representing the offset from the function entry point address to a module global offset table for the module;

testing each function call to determine whether the called function is local to the module or external to the module;

replacing each external function call with a first calculation and storing of the called shared library module global offset table address based on the function entry offset and the function entry point address and then a branch to the function entry address; and replacing each local function call with a direct branch to the function entry point address without recalculating the global offset table address.

2. The method of claim 1, further comprising the steps of:

testing each function call to determine whether it is a pointer function call or an external named function call;

transforming each external named function call to a pointer function call by determining the pointer value for the external function from the current global offset table by accessing an offset from the global offset table address.

3. The method of claim 1, wherein the calculation of the global offset table address for the called function is performed during processor cycles otherwise lost to a pipeline stall.

4. A computer program product having a computer readable medium having computer program logic recorded thereon for reducing function call global offset table address calculation during compilation of a plurality of callable functions compiled to create a shared library module containing executable code, the module having memory position independent code and a global offset table for resolving internal and external function references, said computer program product comprising:

computer program product means for causing a computer system to insert before each function entry point a function entry offset value representing the offset from the function entry point address to a module global offset table for the module;

computer program product means for causing a computer system to test each function call to determine whether the called function is local to the module or external to the module;

computer program product means for causing a computer system to replace each external function call with a first calculation and storing of the called shared library module global offset table address based on the function entry offset and the function entry point address and then a branch to the function entry address; and computer program product means for causing a computer system to replace each local function call with a direct branch to the function entry point address without recalculating he global offset table address.

5. The computer program product of claim 4, further comprising:

computer program product means for causing a computer system to test each function call to determine whether it is a pointer function call or an external named function call;

computer program product means for causing a computer system to transform each external named function call to a pointer function call by determining the pointer value for the external function from the current global offset table by accessing an offset from the global offset table address.

6. The computer program product of claim 5, wherein the calculation of the global offset table address for the called function is performed during processor cycles otherwise lost to a pipeline stall.

* * * * *